US011702147B1

(12) United States Patent
Kleven

(10) Patent No.: US 11,702,147 B1
(45) Date of Patent: Jul. 18, 2023

(54) TRUCK BED TECHNOLOGY

(71) Applicant: Builtrite, LLC, Two Harbors, MN (US)

(72) Inventor: Maxwell N. Kleven, Duluth, MN (US)

(73) Assignee: Builtrite, LLC, Two Harbors, MN (US)

(*) Notice: Subject to any disclaimer, the term of this patent is extended or adjusted under 35 U.S.C. 154(b) by 65 days.

(21) Appl. No.: 17/578,933

(22) Filed: Jan. 19, 2022

(51) Int. Cl.
 *B62D 33/02* (2006.01)
 *B62D 25/20* (2006.01)
 *B60P 1/54* (2006.01)

(52) U.S. Cl.
 CPC ............ *B62D 33/02* (2013.01); *B60P 1/5423* (2013.01); *B62D 25/2054* (2013.01)

(58) Field of Classification Search
 CPC .. B62D 25/2054; B60P 1/5423; B60P 1/5428; B60P 1/5433
 USPC ........................................... 296/183.1, 184.1
 See application file for complete search history.

(56) References Cited

U.S. PATENT DOCUMENTS

| | | | |
|---|---|---|---|
| 4,644,631 A | 2/1987 | Shock | |
| 4,645,258 A * | 2/1987 | Ohmura | B62D 25/2054 |
| | | | 105/422 |
| 6,022,068 A | 2/2000 | D Amico | |
| 6,520,590 B2 | 2/2003 | Feuereisen Azocar | |
| 7,517,005 B2 | 4/2009 | Kuriakose | |
| 10,683,043 B2 | 6/2020 | Booher et al. | |
| 11,618,506 B1 * | 4/2023 | Williamson | B62D 65/02 |
| | | | 296/193.07 |
| 2004/0090036 A1 * | 5/2004 | Schillinger | B62D 29/008 |
| | | | 280/166 |
| 2014/0015279 A1 | 1/2014 | De Paula E Silva et al. | |
| 2016/0129947 A1 * | 5/2016 | Isaksson | E04B 5/02 |
| | | | 52/794.1 |
| 2018/0194266 A1 * | 7/2018 | Kappi | A01G 23/00 |
| 2019/0100253 A1 * | 4/2019 | McKinney | B62D 25/2054 |
| 2020/0215995 A1 | 7/2020 | Persson et al. | |
| 2021/0276474 A1 | 9/2021 | Roskopf | |
| 2021/0277613 A1 * | 9/2021 | Hendricks, Sr. | G05D 1/0094 |
| 2022/0001940 A1 * | 1/2022 | Chumchal | B62D 33/023 |
| 2023/0046294 A1 * | 2/2023 | Foran | B32B 27/36 |

OTHER PUBLICATIONS

Drawings and photographs of wood-decked truck bed construction, believed to have been in public use and on-sale prior to the filing date of the present application, 6 pages.
Drawings and photographs of all-steel welded truck bed construction, believed to have been in public use and on-sale prior to the filing date of the present application, 3 pages.

* cited by examiner

*Primary Examiner* — Gregory A Blankenship
(74) *Attorney, Agent, or Firm* — Fredrikson & Byron, P.A.

(57) ABSTRACT

The invention provides a multi-layer truck bed. The truck bed includes a frame, a layer of backer plates, and a layer of non-slip plates. The frame is under the layer of backer plates, the layer of backer plates is under the layer of non-slip plates. The truck bed is elongated in a first direction. The frame includes a plurality of metal crossmembers extending crosswise to the first direction. The backer plates are formed of a first metal, and the non-slip plates are formed of a second metal. The first metal has a higher strength than the second metal. In some embodiments, the invention provides a truck that includes the truck bed and has a material handler mounted thereon, and the material handler includes a boom.

20 Claims, 5 Drawing Sheets

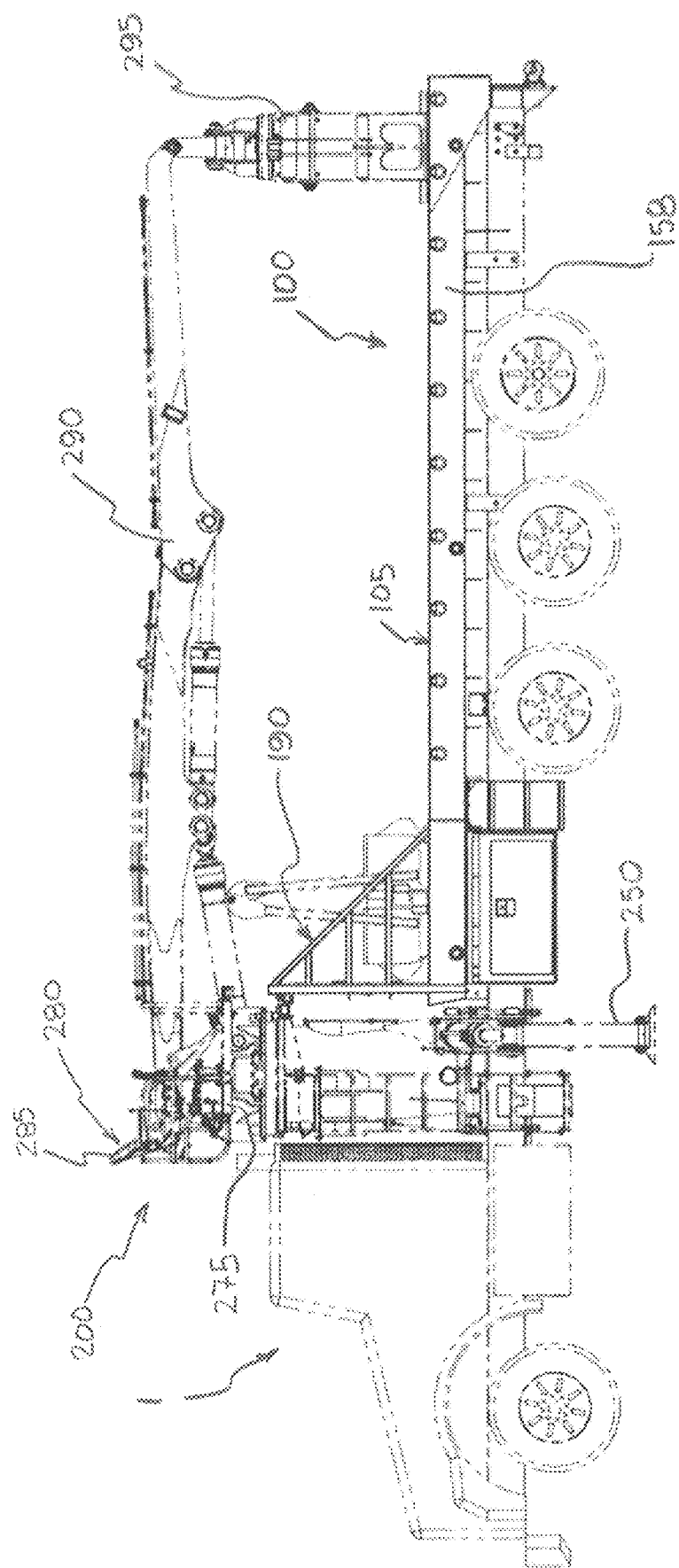

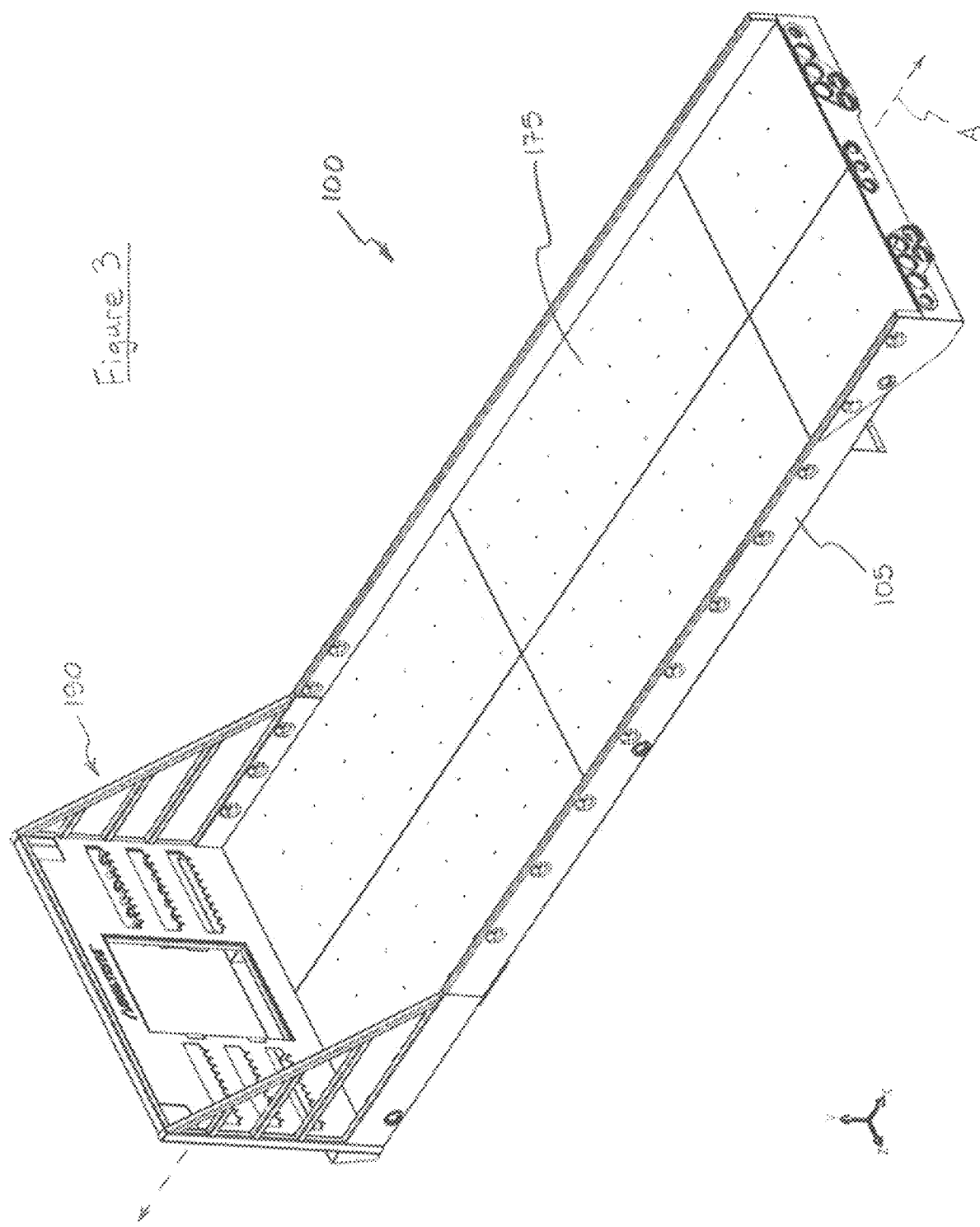

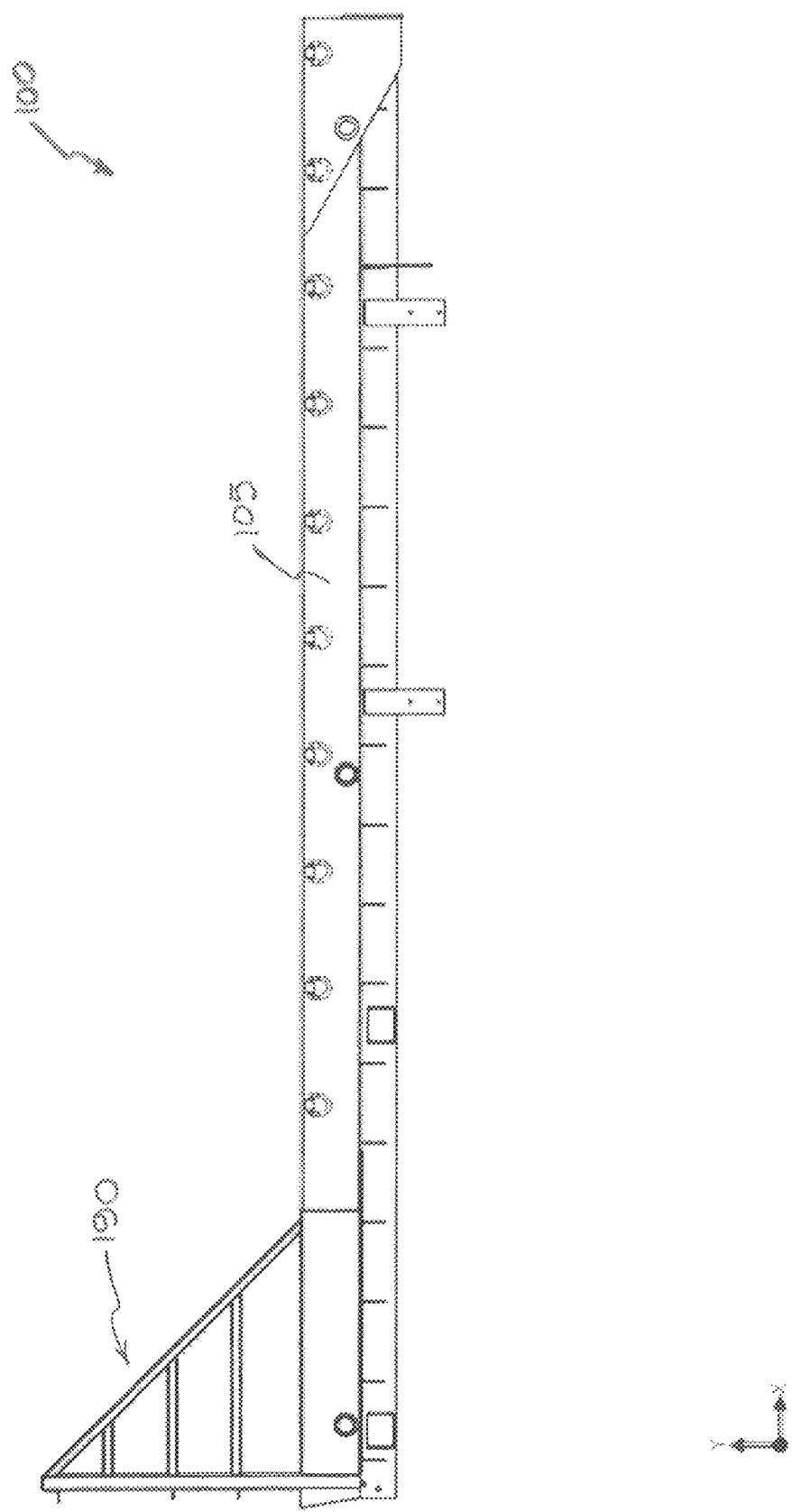

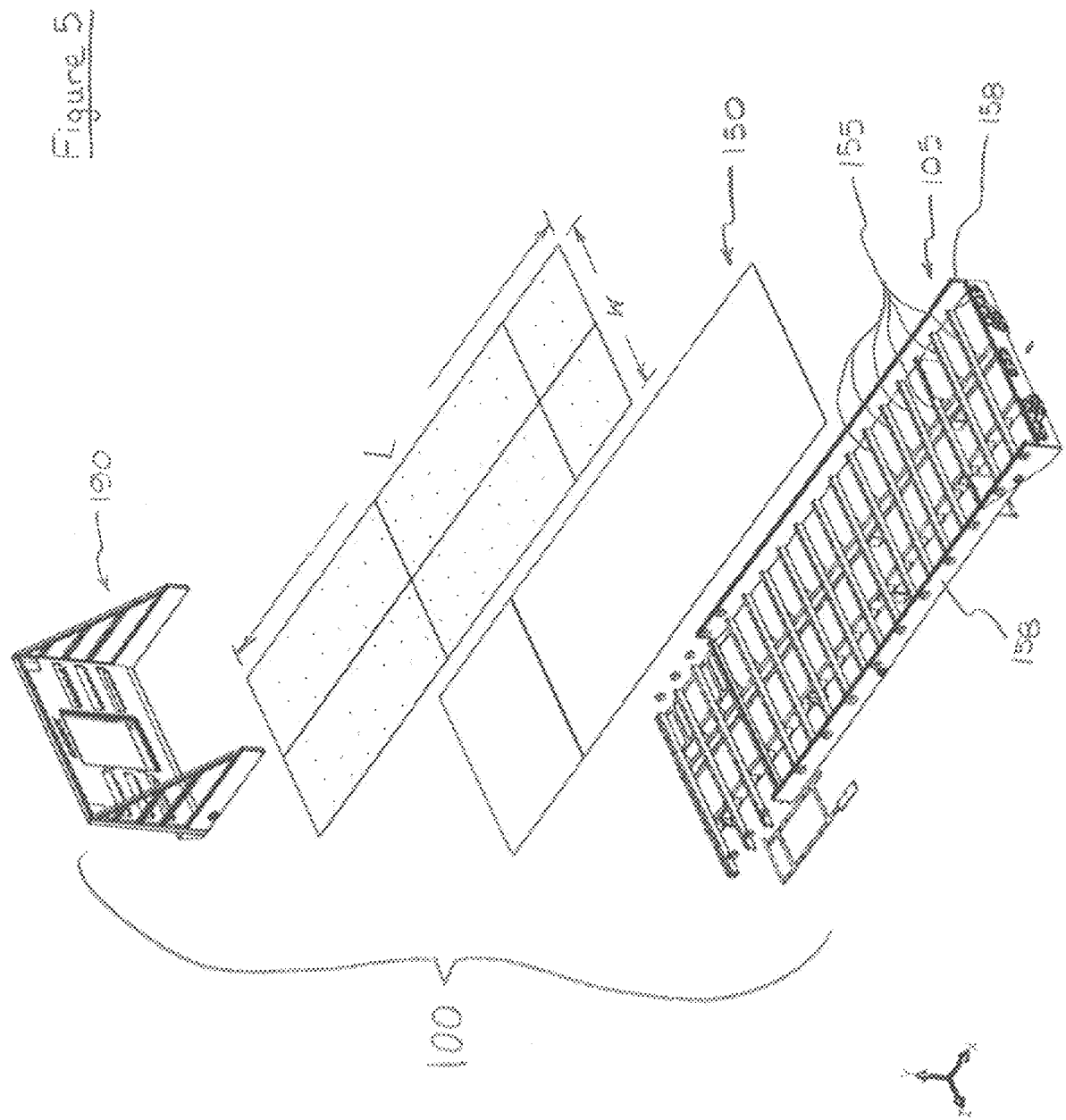

TRUCK BED TECHNOLOGY

TECHNICAL FIELD

The present invention relates generally to truck beds. More particularly, the invention relates to truck beds having metal decking.

BACKGROUND

Material handlers are machines that can move material from one place to another, e.g., using a boom with a grapple at the end for grabbing and moving the material. Such handlers can be used to move all sorts of materials, such as construction and demolition waste, recycling, logs, railroad ties, highway barriers, pipes, large drilling or pipeline tooling, and many other materials. Material handlers are commonly mounted on trucks.

Conventional truck beds are either decked with wood or steel. The steel used in conventional steel truck beds deforms over time, e.g., under repeated heavy loading. Wood-decked truck beds do not deform under repeated heavy loading, but they are limited in terms of gouging or breaking based on the material properties of the wood used.

Conventional steel truck beds have steel frame crossmembers and a layer of A-36 steel with "diamond plate" or a similar non-slip surface. Many closely spaced crossmembers are needed to support loads. Even with many such crossmembers, conventional steel beds of this nature deform over time between the crossmembers under repeated heavy loading. Moreover, the layer of A-36 steel used in such conventional beds is quite thick. Due to the foregoing features, the truck bed is heavy and its manufacture is time consuming.

SUMMARY

In one group of embodiments, the invention provides a truck bed that includes a frame, a layer of backer plates, and a layer of non-slip plates. The frame is under the layer of backer plates, and the layer of backer plates is under the layer of non-slip plates. The truck bed is elongated in a first direction. The frame includes a plurality of metal crossmembers extending crosswise to the first direction. The backer plates are formed of a first metal, and the non-slip plates are formed of a second metal. The first metal has a higher strength than the second metal. In the present embodiment group, the thickness of the backer plates can optionally be greater than the thickness of the non-slip plates.

In another group of embodiments, the invention provides a truck that includes a material handler mounted thereon as well as a truck bed of the foregoing nature. In the present embodiments, the material handler includes a boom.

In embodiments of either group, the following features can optionally be provided: the backer plates have a thickness in a range of 0.12-0.24 inch and are formed of material having a yield strength in a range of 75-140 ksi, in combination with the non-slip plates having a thickness in a range of 0.1-0.24 inch and being formed of material having a yield strength in a range of 30-55 ksi. In addition, the thickness of the backer plates can optionally be greater than the thickness of the non-slip plates.

Moreover, in certain embodiments of either group, the thickness of the backer plates is in a range of 0.17-0.22 inch, the yield strength of the material from which the backer plates are formed is in a range of 80-110 ksi, the thickness of the non-slip plates is in a range of 0.1-0.16 inch, and the yield strength of the material from which the non-slip plates are formed is in a range of 35-55 ksi. In such embodiments, the thickness of the backer plates can optionally be greater than the thickness of the non-slip plates.

BRIEF DESCRIPTION OF THE DRAWINGS

FIG. 2 is a side view of the truck of FIG. 1.

FIG. 3 is a perspective view of a multi-layer truck bed in accordance with another embodiment group of the invention.

FIG. 4 is a side view of the truck bed of FIG. 3.

FIG. 5 is an exploded perspective view of the truck bed of FIG. 3.

DETAILED DESCRIPTION

Figure 1:
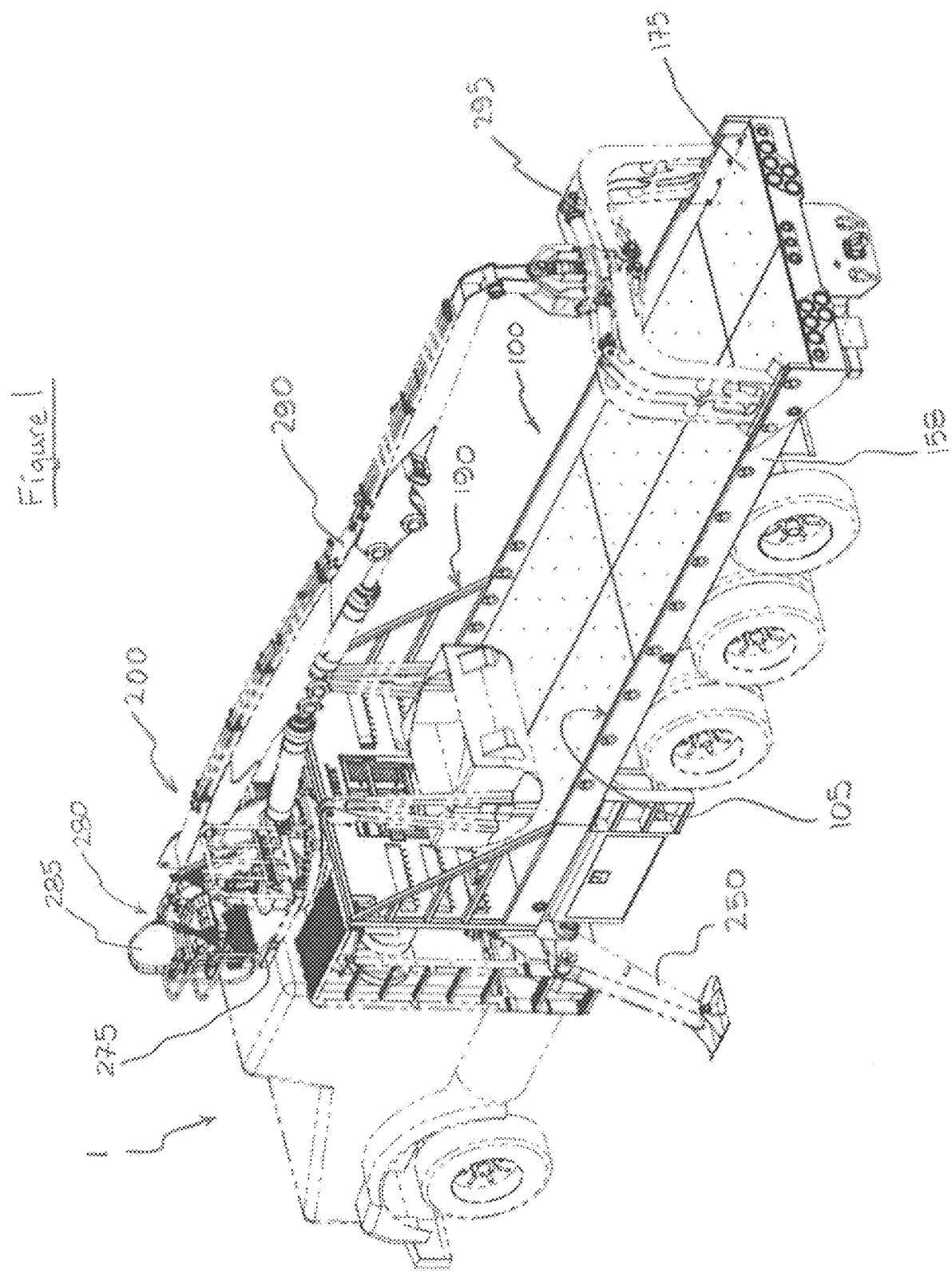
FIG. 1 is a perspective view of a truck that has a material handler mounted thereon and includes a multi-layer truck bed in accordance with one embodiment group of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In a first group of embodiments, the invention provides a multi-layer truck bed 100. The truck bed 100 includes a frame 105, a layer of backer plates 150, and a layer of non-slip plates 175. Reference is made to FIGS. 3-5. The frame 105 is under the layer of backer plates 150, and the layer of backer plates is under the layer of non-slip plates 175. This is perhaps best appreciated by referring to FIG. 5.

The backer plate(s) 150 are formed of a first metal, the non-slip plate(s) 175 are formed of a second metal, and the first metal has a higher yield strength than the second metal. In addition, the backer plate(s) 150 can optionally have a greater thickness than the non-slip plate(s) 175. This can optionally be the case for any embodiment of the present disclosure.

Preferably, the layer of non-slip plates 175 is an exposed, top layer of the truck bed 100 (this can optionally be the case over the entire deck area of the truck bed). Reference is made to FIG. 3.

The two illustrated plate layers 150, 175 are carried one alongside the other, preferably in contact with each other. There may be nothing between the two plate layers 150, 175 (this can optionally be the case over the entire deck area of the truck bed). In addition, there may be nothing between the layer of backer plates 150 and the underlying crossmembers 155 of the frame 105.

It is to be appreciated that the phrase "layer of backer plates," as used herein, refers to either a layer formed by multiple backer plates or a layer formed by a single backer plate. Similarly, the phrase "layer of non-slip plates," as used herein, refers to either a layer formed by multiple non-slip plates or a layer formed by a single non-slip plate.

As can be seen in FIGS. 1, 3, and 5, the illustrated layer of backer plates 150 has two backer plates collectively forming the layer. This, however, is merely one example. The layer of backer plates can alternatively be formed by a larger, single backer plate, e.g., a single backer plate that spans the entire decked area of the truck bed. As another alternative, the layer of backer plates can be formed by six backer plates of the same sizes and arrangement that are shown for the six non-slip plates forming the illustrated layer of non-slip plates 175. As still another alternative, the layer of backer plates can be formed by four backer plates, e.g., four backer plates that collectively span the entire decked area of the truck bed. Various other numbers and arrangements of backer plates can be used to form the layer of backer plates 150.

With continued reference to FIGS. 1, 3, and 5, the illustrated layer of non-slip plates 175 has six non-slip plates collectively forming the layer. This, however, is merely one example. The layer of non-slip plates can alternatively be formed by a larger, single non-slip plate, e.g., a single non-slip plate that spans the entire decked area of the truck bed. As another alternative, the layer of non-slip plates can be formed by two non-slip plates of the same sizes and arrangement that are shown for the two backer plates forming the illustrated layer of backer plates 150. As still another alternative, the layer of non-slip plates can be formed by four non-slip plates, e.g., four non-slip plates that collectively span the entire decked area of the truck bed. Various other numbers and arrangements of non-slip plates can be used to form the layer of non-slip plates 175.

The truck bed 100 is elongated in a first direction (e.g., along axis A), and the frame 105 includes a plurality of metal crossmembers 155 extending crosswise (optionally perpendicular) to the first direction. In certain embodiments, the crossmembers 155 are perpendicular (or at least substantially perpendicular) to the axis A and are centered respectively on cross axes that are spaced apart by 15 inches or more, such as being spaced apart by a separation distance in a range of 15.5-19 inches, e.g., 16-18 inches. This can optionally be the case for any embodiment of the present disclosure. In one non-limiting example, the crossmembers 155 are perpendicular to the axis A and are centered respectively on cross axes that are spaced apart by about 16 inches. If desired, the crossmembers can extend crosswise at various angles (e.g., 30-60 degrees, such as 45 degrees) relative to axis A.

The layer of non-slip plates 175 preferably is welded to the layer of backer plates 150. In some cases, the layer of non-slip plates is slot welded to the layer of backer plates. In addition, the layer of backer plates 150 preferably is welded (e.g., slot welded or plug welded) to crossmembers 155 of the frame 105. Furthermore, the frame 150 preferably includes side members (e.g., side tubes) 158 to which the layer of backer plates 150 is also welded. Alternatively, one or more such connections can be provided by a plurality of mechanical fasteners, such as screws, bolts, or the like.

The backer plate(s) 150 have a thickness of less than 0.25 inch. Preferably, the thickness of the backer plate(s) is in a range of 0.12-0.24 inch, such as 0.17-0.22 inch. In some cases, the thickness is less than 0.2 inch. In one example, the thickness of the backer plate(s) is about 0.188 inch. This, however, is by no means limiting. Rather, various other thicknesses can be selected to accommodate different applications. In some embodiments, the backer plate(s) 150 have a thickness in any range reported in this paragraph in combination with having a greater thickness than the non-slip plate(s) 175.

The backer plate(s) 150 preferably are formed of material (e.g., steel) having a yield strength of greater than 70 ksi. In some cases, the yield strength of the backer plate(s) is in a range of 75-140 ksi, such as 80-110 ksi. For any embodiment of the present disclosure, the yield strength of the backer plate(s) can optionally be in one or both of these ranges. For certain heavy duty applications, the yield strength of the backer plate(s) is greater than 90 ksi. In one non-limiting example, the backer plate(s) are formed of material (e.g., steel) having a yield strength of about 100 ksi.

For lighter duty applications, the yield strength of the backer plate(s) may be in a range of 50-75 ksi. Thus, broadly speaking, the yield strength of the backer plate(s) may be in a range of 50-140 ksi.

Suitable steel plate material for the backer plate(s) is commercially available from a variety of well-known suppliers, including McNeilus Steel, Inc. of Dodge Center, Minn., USA.

The non-slip plate(s) 175 have a thickness of less than 0.25 inch. Preferably, the thickness of the non-slip plates is in a range of 0.1-0.24 inch, such as 0.1-0.16 inch. In one non-limiting example, the thickness of the non-slip plate(s) is about 0.13 inch. In some embodiments, the non-slip plate(s) 175 have a thickness in any range reported in this paragraph in combination with having a lesser thickness than the backer plate(s) 150.

The non-slip plate(s) 175 preferably are formed of material (e.g., steel) having a yield strength of less than 60 ksi. In some cases, the yield strength of the non-slip plate(s) is in a range of 30-55 ksi. This can optionally be the case for any embodiment of the present disclosure. In one non-limiting example, the non-slip plate(s) are formed of material (e.g., steel) having a yield strength of about 36 ksi.

The non-slip plate(s) 175 preferably have (e.g., define) a raised pattern and/or texture. One suitable example is a four-way raised pattern, such as diamond plate. Many other raised patterns and/or textures can be provided, such as raised lentils, round beans, or oblate shapes.

Suitable steel plate material for the non-slip plate(s) is commercially available from a variety of well-known suppliers, including the Brown-Campbell Company of Shelby Township, Mich., USA.

In certain embodiments, the backer plate(s) 150 have a thickness in a range of 0.12-0.24 inch and are formed of material having a yield strength in a range of 75-140 ksi, while the non-slip plate(s) 175 have a thickness in a range of 0.1-0.24 inch and are formed of material having a yield strength in a range of 30-55 ksi.

The truck bed 100 preferably has a deck length L (measured parallel to axis A) in a range of 12-60 feet, such as 15-40 feet. In addition, the truck bed 100 preferably has a deck width W (measured perpendicular to axis A) in a range of 5-12 feet, such as 6-10 feet. Thus, the layer of backer plates 150 and the layer of non-slip plates 175 preferably each have a length and width in one or more of the foregoing length and width ranges (e.g., length in a range of 12-60 feet, width in a range of 5-12 feet). In some cases, the length of the bed is 24 feet, while the width is not more than 102 inches, such as 100 inches. It is to be appreciated that these details are by no means limiting.

With reference to FIGS. 3-5, the illustrated embodiment includes a bulkhead (or "headache rack" or "headboard") 190. The bulkhead 190 is attached (e.g., welded) to the frame 105. Reference is made to FIGS. 3 and 5. The particular configuration of the bulkhead 190 is not limiting to the invention. Moreover, while preferred, the bulkhead is not strictly required.

In a second group of embodiments, the invention provides a truck 1 having a material handler 200 mounted thereon and a truck bed 100. Reference is made to FIGS. 1 and 2. As will be appreciated by those of ordinary skill in the art, various commercially available truck models can be used. As just one example, the truck can be a model FL80 from Freightliner/Daimler Trucks North America, of Portland, Oreg., USA.

While the material handler 200 shown in FIGS. 1 and 2 is mounted at the back of the cab, skilled artisans will appreciate that the material hander can alternatively be rear mounted.

In the present embodiments, the material handler comprises a boom 290. More will be said of this later.

The truck bed 100 in the second group of embodiments is of the type described above for the first group of embodiments. For example, the truck bed 100 includes a frame 105, a layer of backer plates 150, and a layer of non-slip plates 175. The frame 105 is under the layer of backer platers 150, and the layer of backer plates is under the layer of non-slip plates 175. The truck bed 100 is elongated in a first direction (e.g., along axis A). The frame 105 includes a plurality of metal crossmembers 155 extending crosswise (optionally perpendicular) to the first direction. The backer plate(s) 150 are formed of a first metal, the non-slip plate(s) 175 are formed of a second metal, and the first metal has a higher strength than the second metal. In connection with the various preferred or otherwise optional features of the truck bed 100 in the present truck 1 embodiments, reference is made to the truck bed discussion above relative to the first group of embodiments.

In the second embodiment group, a material handler 200 is mounted on the truck 1. As noted above, the material handler 200 includes a boom 290. Preferably, the material handler 200 includes two stabilizers 250 located on opposite sides of the truck 1, a platform 275 located above (e.g., mounted on top of) a tower, and the boom 290 projects away from the platform. In FIGS. 1 and 2, the illustrated stabilizers 250 are A-frame type stabilizers. In other cases, out-and-down type stabilizers are provided. In still other cases, the stabilizers are omitted. When provided, the platform 275 preferably is rotatable about a vertical axis relative to the tower. A grapple 295 is attached to the boom 290. Reference is made to FIGS. 1 and 2, which show one non-limiting example of such a material handler 200. Here, the illustrated material handler 200 includes an operator station 280 comprising an operator seat 285 and conventional manual operator controls. In other cases, the operator station is omitted and the material handler has a conventional remote control system.

As is conventional and well known, the boom 290 has hydraulic cylinders that allow for movement and control of the boom and the grapple. Preferably, the material handler 200 is a knuckle-boom material handler, such that the boom 290 is configured to articulate among one or more joints.

The boom 290 can move the grapple 295 up and down, forward and rearward, and side-to-side. As is conventional and well known, the material handler preferably includes a hydraulic motor such that the boom is hydraulically actuated. Typically, the material handler is equipped with a plurality of hydraulic cylinders. For example, the boom may include a main boom cylinder and a stick boom cylinder. In some cases, it may also include a grapple cylinder. A variety of conventional boom cylinders are commercially available from different suppliers, such as Lemco Hydraulics of Hill City, Minn., USA. Thus, the material handler preferably has one or more (e.g., a plurality of) hydraulic lines on the boom, as is conventional and well known to those of skill in the present art.

Referring to FIGS. 1 and 2, the boom 290 is shown with a grapple 295 attached to a distal end of the boom. The illustrated grapple 295 is a claw-like device configured to pick up items to be moved. As is well known to those skilled in this area of technology, the boom 290 can be equipped with any of a wide variety of different grapples or attachments. Thus, the grapple 295 can be any type of grapple or attachment known in the art, and will typically be selected based on the use intended for the material handler 200.

The illustrated grapple 295 can be replaced with, for example, various types of log grapples, combination grapples, clam shell grapples, compaction grapples, orange peel grapples, bucket attachments, glass pane attachments, rake attachments, railroad tie grapples, scrap handling attachments, pulpwood handling attachments, magnet rotators, butt tine grapples, tamping grapples, bale clamp grapples, or various rope or cable attachments.

The details of the illustrated material handler 200 are not limiting. FIGS. 1 and 2 merely show one example of a suitable material handler that can be used. Suitable material handlers are commercially available from different suppliers, such as the present applicant: Builtrite Handlers & Attachments, of Two Harbors, Minn., USA. A wide variety of other material handlers can also be used.

In embodiments of either group, the following features can optionally be provided: the thickness of the backer plate(s) 150 is in a range of 0.17-0.22 inch, the yield strength of the material from which the backer plate(s) are formed is in a range of 80-110 ksi, the thickness of the non-slip plate(s) 175 is in a range of 0.1-0.16 inch, and the yield strength of the material from which the non-slip plate(s) are formed is in a range of 35-55 ksi.

In one non-limiting example, the truck bed can be built as follows. To begin, the main frame c-channels (such as the two shown in FIG. 5, which extend along the length of the truck bed, are spaced apart laterally from each other, and are spaced laterally inwardly from the side members 158) are laid out with a specific width (such as a spacing of 34 inches) to match the truck onto which the bed is to be installed. Next, the stringers/crossmembers 155 are laid on top of the main frame perpendicularly with a spacing of 16-18 inches, such as 16 inches. The particular spacing can be varied inside or outside of this range based on the application for the truck bed. The stringers/crossmembers are then welded to the main frame. The stringers/crossmembers preferably are then strengthened, such as by providing triangular gusset plates (see non-limiting example in FIG. 5) that extend from the stringer/crossmember to the main frame and are welded therebetween. Next, the side members (e.g., side tubes) 158, end member (e.g., end tube), and bulkhead/headache rack 190 are tacked and welded in and framed in the bed. Then, thicker gauge and higher yield (relative to the non-slip top plate(s)) backer plate(s) are seam welded to the stringers/crossmembers 155, side members (e.g., side tubes) 158, and end member. Lastly, thinner gauge and lower yield (relative to the backer plate(s)) non-skid plate(s) are plug welded and seam welded to the underlying layer of backer plates 150. In the present non-limiting example, the deck length is 24 feet, and the deck width is 96 inches. It is to be appreciated that these details are by no means limiting; rather they are just examples.

Various non-limiting embodiments have been described. These and others are within the scope of the following claims.

The invention claimed is:

1. A truck having a material handler mounted thereon and a truck bed, the material handler comprising a boom, the truck bed comprising a frame, a layer of backer plates, and a layer of non-slip plates, the frame being under the layer of backer plates, the layer of backer plates being under the layer of non-slip plates, the truck bed being elongated in a first direction, the frame comprising a plurality of metal crossmembers extending crosswise to the first direction, the backer plates being formed of a first metal, the non-slip plates being formed of a second metal, and the first metal having a higher strength than the second metal.

2. The truck of claim 1, wherein the layer of non-slip plates is welded to the layer of backer plates.

3. The truck of claim 1, wherein the layer of non-slip plates is an exposed, top layer of the truck bed.

4. The truck of claim 1, wherein the backer plates have a thickness of less than 0.25 inch.

5. The truck of claim 4, wherein the backer plates are formed of material having a yield strength of greater than 70 ksi.

6. The truck of claim 1, wherein the non-slip plates have a thickness of less than 0.25.

7. The truck of claim 6, wherein the non-slip plates have a yield strength of less than 60 ksi.

8. The truck of claim 1, wherein the backer plates have a thickness in a range of 0.12-0.24 inch and are formed of material having a yield strength in a range of 75-140 ksi, whereas the non-slip plates have a thickness in a range of 0.1-0.24 inch and are formed of material having a yield strength in a range of 30-55 ksi, and the thickness of the backer plates is greater than the thickness of the non-slip plates.

9. The truck of claim 1, wherein the non-slip plates include a raised pattern.

10. A truck bed comprising a frame, a layer of backer plates, and a layer of non-slip plates, the frame being under the layer of backer plates, the layer of backer plates being under the layer of non-slip plates, the truck bed being elongated in a first direction, the frame comprising a plurality of metal crossmembers extending crosswise to the first direction, the backer plates being formed of a first metal, the non-slip plates being formed of a second metal, and the first metal having a higher strength than the second metal.

11. The truck bed of claim 10, wherein the layer of non-slip plates is welded to the layer of backer plates.

12. The truck bed of claim 10, wherein the layer of non-slip plates is an exposed, top layer of the truck bed.

13. The truck bed of claim 10, wherein the backer plates have a thickness of less than 0.25 inch.

14. The truck bed of claim 13, wherein the backer plates are formed of material having a yield strength of greater than 70 ksi.

15. The truck bed of claim 10, wherein the non-slip plates have a thickness of less than 0.25 inch.

16. The truck bed of claim 15, wherein the non-slip plates have a yield strength of less than 60 ksi.

17. The truck bed of claim 10, wherein the backer plates have a thickness in a range of 0.12-0.24 inch and are formed of material having a yield strength in a range of 75-140 ksi, whereas the non-slip plates have a thickness in a range of 0.1-0.24 inch and are formed of material having a yield strength in a range of 30-55 ksi.

18. The truck bed of claim 10, wherein the non-slip plates include a raised pattern.

19. A truck bed comprising a frame, a layer of backer plates, and a layer of non-slip plates, the frame being under the layer of backer plates, the layer of backer plates being under the layer of non-slip plates, the truck bed being elongated in a first direction, the frame comprising a plurality of metal crossmembers extending crosswise to the first direction, the backer plates being formed of a first metal, the non-slip plates being formed of a second metal, and the first metal having a higher strength than the second metal, wherein the backer plates have a thickness in a range of 0.12-0.24 inch and are formed of material having a yield strength in a range of 75-140 ksi, while the non-slip plates have a thickness in a range of 0.1-0.24 inch and are formed of material having a yield strength in a range of 30-55 ksi, and the thickness of the backer plates is greater than the thickness of the non-slip plates.

20. The truck bed of claim 19 wherein the thickness of the backer plates is in a range of 0.17-0.22 inch, the yield strength of the material from which the backer plates are formed is in a range of 80-110 ksi, the thickness of the non-slip plates is in a range of 0.1-0.16 inch, and the yield strength of the material from which the non-slip plates are formed is in a range of 35-55 ksi.

* * * * *